US008630802B2

(12) United States Patent
Green

(10) Patent No.: US 8,630,802 B2
(45) Date of Patent: Jan. 14, 2014

(54) METHOD AND APPARATUS FOR TRAJECTORY DISPLAY

(75) Inventor: Jeremy Green, Edinburgh (GB)

(73) Assignee: TomTom International B.V., Amsterdam (NL)

( * ) Notice: Subject to any disclaimer, the term of this patent is extended or adjusted under 35 U.S.C. 154(b) by 257 days.

(21) Appl. No.: 12/736,708

(22) PCT Filed: Jun. 24, 2009

(86) PCT No.: PCT/EP2009/057881
§ 371 (c)(1),
(2), (4) Date: Nov. 23, 2010

(87) PCT Pub. No.: WO2009/156429
PCT Pub. Date: Dec. 30, 2009

(65) Prior Publication Data
US 2011/0082637 A1    Apr. 7, 2011

Related U.S. Application Data

(60) Provisional application No. 61/129,413, filed on Jun. 25, 2008.

(51) Int. Cl.
*G01C 21/00* (2006.01)
(52) U.S. Cl.
USPC .......................................... 701/431; 701/400
(58) Field of Classification Search
USPC ........................ 701/400, 408–412
See application file for complete search history.

(56) References Cited

U.S. PATENT DOCUMENTS

| 4,843,599 A | 6/1989 | Bucker |
| 5,220,507 A | 6/1993 | Kirson |
| 5,283,858 A | 2/1994 | Moellering et al. |
| 6,862,524 B1 | 3/2005 | Nagda et al. |
| 2003/0009277 A1 | 1/2003 | Fan et al. |
| 2005/0075116 A1* | 4/2005 | Laird et al. ................. 455/456.3 |

FOREIGN PATENT DOCUMENTS

GB    2 210 457    6/1989

OTHER PUBLICATIONS

International Preliminary Report on Patentability dated Jan. 5, 2011.

* cited by examiner

*Primary Examiner* — Hussein A. Elchanti

(57) ABSTRACT

Embodiments of the present invention provide an apparatus including a display device for displaying graphical information; a processor arranged to control the display device to display the graphical information; a store for color mapping information, the information being representative of a relationship between orientation-related information of a trajectory and color; and a trajectory-color module for determining orientation-related information of a trajectory and a color according to the determined information and the color mapping information. In at least one embodiment, the processor is responsive to the trajectory-color module to control the display device to display a graphical element at least partly in the determined color.

17 Claims, 10 Drawing Sheets

METHOD AND APPARATUS FOR TRAJECTORY DISPLAY

This is a National Phase of PCT Patent Application No. PCT/EP2009/057881, filed on Jun. 24, 2009, which claims priority under 35 U.S.C. §365(c) and 119(e) to U.S. Provisional Application No. 61/129,413, filed on Jun. 25, 2008, the contents of each of which are hereby incorporated herein by reference in their entirety.

FIELD OF THE INVENTION

This invention relates to methods and apparatus for displaying trajectories. In particular, although not exclusively, embodiments of the invention relate to methods and apparatus for indicating orientation-related information of a trajectory and, more particularly, for simultaneously indicating orientation-related information of a plurality of trajectories. Illustrative embodiments of the invention relate to portable navigation devices (so-called PNDs), in particular PNDs that include Global Positioning System (GPS) signal reception and processing functionality. Other embodiments relate, more generally, to any type of processing device that is configured to display trajectories, such as data processing systems used to analyse measured or received data.

BACKGROUND

A trajectory is a path in a two-dimensional workspace. A trajectory may be discretised or continuous and may result from a physical process, measurement of one or more parameters, or be entirely abstract. Sometimes it is necessary, for example when displaying an indication of measured data, to display a plurality of anti-parallel trajectories. In such situations, it is difficult to distinguish each of the plurality of trajectories due to, for example, the representations of the trajectories at least partially overlapping.

FIG. 1 shows twenty one simulated vehicle trajectories with each trajectory being represented by a piecewise-linear curve. The trajectories are formed by position measurements of each vehicle at periodic intervals with random errors included. A direction of motion is indicated by arrowheads superimposed at regular time intervals on each curve, the arrow heads providing an indication of time-dependant speed. However, one of the trajectories shown in FIG. 1 is for a vehicle heading in an opposing direction to the other vehicles.

It is difficult to individually resolve the overlapping trajectories, and to establish which trajectory is for the wrongly directed vehicle. One solution to this would be to represent each trajectory using thinner lines, and possibly also making the symbols smaller, but eventually the trajectories would become illegible and not convey the desired information.

It is an object of embodiments of the invention to at least mitigate one or more of the problems of the prior art.

SUMMARY OF THE INVENTION

In pursuit of this aim, a presently preferred embodiment of the present invention provides a navigation device comprising: an apparatus comprising a display device for displaying graphical information; a processor arranged to control the display device to display the graphical information; characterised in that the apparatus further comprises: a store for colour mapping information, said information being representative of a relationship between orientation-related information of a trajectory and colour; a trajectory-colour module for determining orientation-related information of a trajectory and a colour according to the determined information and the colour mapping information, said processor being responsive to the trajectory-colour module to control the display device to display a graphical element at least partly in the determined colour.

Another embodiment of the present invention relates to a graphical display method, characterised by determining orientation-related information of a trajectory; determining a colour corresponding to the information; displaying a graphical element on a display device at least partly in the determined colour.

Yet another embodiment of the present invention relates to computer software comprising one or more software modules operable, when executed in an execution environment, to cause a processor to a graphical display method, characterised by: determining orientation-related information of a trajectory; determining a colour corresponding to the information; displaying a graphical element on a display device at least partly in the determined colour.

Advantages of these embodiments are set out hereafter, and further details and features of each of these embodiments are defined in the accompanying dependent claims and elsewhere in the following detailed description.

BRIEF DESCRIPTION OF THE DRAWINGS

Various aspects of the teachings of the present invention, and arrangements embodying those teachings, will hereafter be described by way of illustrative example with reference to the accompanying drawings, in which.

DETAILED DESCRIPTION OF PREFERRED EMBODIMENTS

Embodiments of the present invention will now be described with reference to a data analysis system. However, it will be realised that other embodiments of the present invention may be envisaged which display an indication of orientation-related information of one or more trajectories. For example, embodiments of the present invention are computing devices which indicate a direction or gradient of a trajectory. Furthermore, embodiments of the present invention will be described with reference to trajectories formed by a parameterised path in which the parameter is time and the trajectory is a discretized measurement of position, although it will be understood that other parameters and discretized values may be considered.

Figure 2:
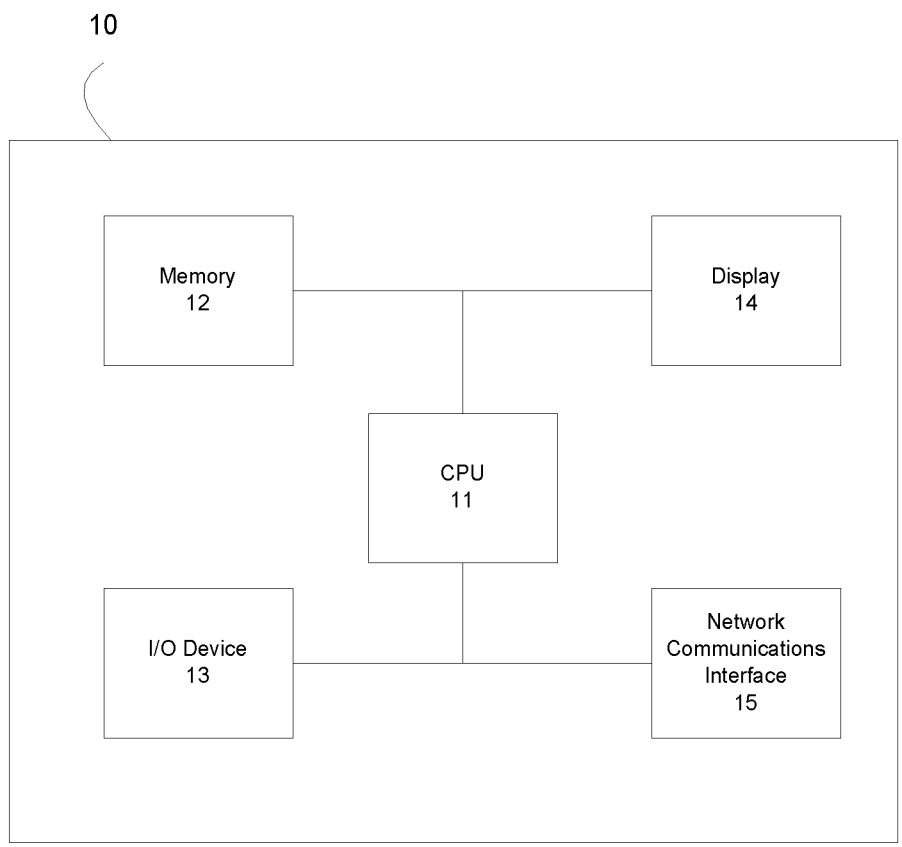
FIG. 2 is a schematic representation of a computing device according to an embodiment of the invention.

FIG. 2 shows a computing device 10 for displaying route data received from one or a plurality of navigation devices. The computing device 10 comprises a CPU 11 operatively connected to memory 12, one or more I/O devices 13, a display 14 and a network communications interface 15. The computing device 10 may be a desktop type computer, a portable computing device, or a computing device formed by a plurality of network-based components, wherein, for example, the display 14 is in communication with, but may not necessarily be part of the same physical device as the CPU 11. It will be realised that the composition of the computing device 10 is merely illustrative and that various changes may be made.

The computing device 10 is arranged to receive route data from the one or more navigation devices (not shown) through the network communications interface 15 from a server computer (not shown). Alternatively, the computing device 10 may receive the route data from the one or more navigation devices directly i.e. the computing device 10 may communicate with the navigation devices as the server. In both cases, the computing device 10 is arranged to access the route data for display on the display device 14 to a user. The route data includes position information of each navigation device at periodic intervals. For example, the route data may comprise a location of each navigation device in a predetermined coordinate system at predetermined time intervals. In this way, a distance between each pair of locations allows an average speed of the navigation device (and the vehicle or person transporting the navigation device) to be determined between the pair of locations. Furthermore, an average direction or heading of the navigation device between the pair of locations may also be determined.

The computing device 10 is arranged to display on the display device 14 an indication of one or more trajectories determined from the position information of each navigation device. A trajectory may be formed by parameterised coordinate pairs. In this case, the trajectory indicates a route followed by each navigation device. Each trajectory is displayed in colour on the display device 14 and a local colour, which is a colour at a locality of the trajectory i.e. relevant to that part of the trajectory, of each trajectory indicates a local direction of that trajectory. That is, the local colour of each trajectory is determined based upon the local direction or heading of that trajectory at that point. Other orientation-related attributes of the trajectory may be considered in embodiments of the invention, such as a local gradient of the trajectory.

Figure 3:
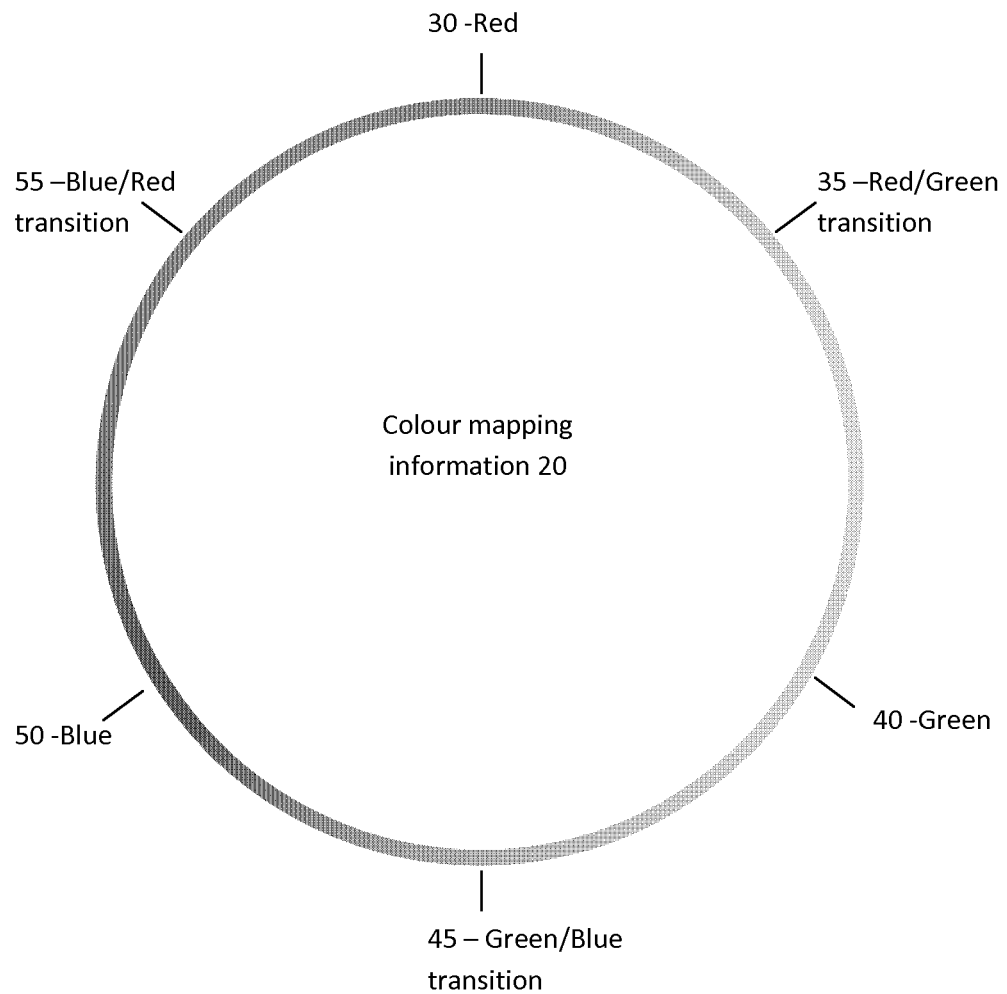
FIG. 3 is an illustration of a attribute-colour mapping information according to an embodiment of the invention.

In order to determine the local colour at one of a plurality of points on the trajectory, the memory 12 of the computing device 10 stores information mapping an angular direction to colour. FIG. 3 provides an example illustration of colour mapping information 20 stored in the memory 12. As shown in FIG. 3, the colour mapping information 20 is illustrated as an annulus, or ring, the colour of which varies continuously around the annulus. That is, the colour of the annulus changes there-around so that each radial location on the annulus is a unique colour. In this way, for any rotational angle determined from a centre of the annulus and a predetermined reference vector e.g. 0° being right, a unique colour may be determined for the angle. In this way, a displayed graphical element having a given colour provides an indication of its direction of movement or heading to the user. The colour mapping information may relate, in other embodiments, the orientation-related attribute to colour, such as gradient to colour.

In some embodiments, the colour mapping information 20 may be determined by selecting a plurality of reference angles to each have a reference or base colour. For example, the colour mapping information 20 shown in FIG. 3 comprises three base colours: red 30, green 40 and blue 50. In this embodiment shown in FIG. 3, the base colours 30, 40, 50 are equally distributed around the annulus at 120° intervals. However, it will be realised that other distributions and numbers of base colours may be chosen. In between each base colour, the colour of the annulus changes or transitions (i.e. the colours graduate) between the two adjoining base colours. The colour may change in a step-wise manner, through various degrees of sigmoidal, or linearly. For example, an area 35 between red 30 and green 40 smoothly graduates between red and green, resulting in the annulus having an orange colour at a point there-between. Similarly, an area 45 of the annulus between green 30 and blue 40 smoothly graduates between green and blue, resulting in an aqua colour at a point there-between, and an area 55 between blue 40 and red 20 is purple. Whilst the colour mapping information is described with reference to a plurality of base colours, in other embodiments non-constant periodic angle-to-colour mapping having a period of 360° may be achieved in other ways, such as by mathematical conversion.

In FIG. 3, three base colours 30, 40, 50 have been selected for the colour mapping information 20. However, it will be realised that any number of two or more base colours may be chosen, although with only two base colours it is not possible to distinguish opposing directions if the base colours are evenly distributed at 180° intervals. Whilst FIG. 3 illustrates the direction-to-colour mapping information 20 as an annulus, the information may be stored in memory 12 in any form. In one embodiment, the colour mapping information 20 is stored in the memory 12 in the form of a look-up table against which a colour may be determined for a given angle. In another embodiment, the memory 12 stores a conversion equation which converts, for example, an angle to CMYK values. Determination of an angle of a vector and determination of a colour corresponding to the angle is performed by a direction-to-colour module operative to control the CPU 11 of the computing device. It is preferable, although not essential, for the colour to change smoothly with angle and for opposing directions to have different colours in order to allow them to be distinguished. Still more preferably, opposing directions have contrasting colours, as perceived by humans, and for opposing directions to have unique colours within the limits of the display technology.

Figure 4:
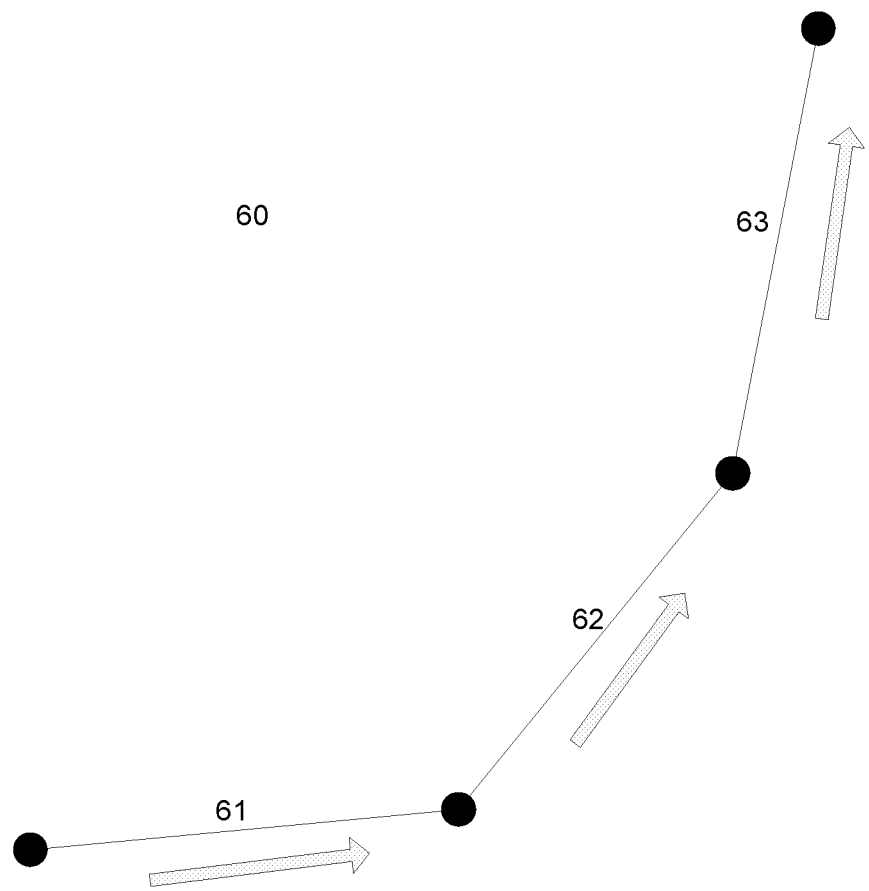
FIG. 4 is an illustration of an example trajectory formed by three vectors.

FIG. 4 illustrates a discretized trajectory 60 displayed on the display 14 by control of the CPU 11. The trajectory 60 is formed by four recorded positions at unit time intervals between which may be determined three vectors 61, 62, 63 representing movement of the navigation device in the direction of the arrows shown.

Figure 5:
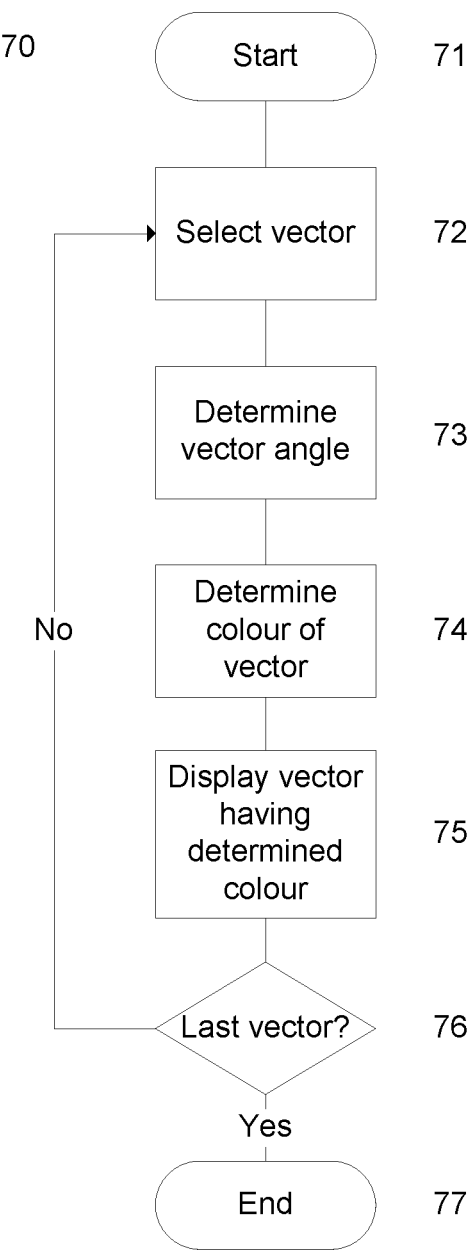
FIG. 5 is an illustration of a method according to an embodiment of the invention.

A method 70 of displaying the three vectors 61, 62, 63 will now be described with reference to FIG. 5. The method starts in step 71. In step 72 a vector forming at least part of the trajectory to be displayed is selected. For example, to display the trajectory in FIG. 4 a first vector 61 between first and second position measurements may be selected in step 72. In step 73 an angle of that vector 61 is determined. The angle of the vector may be determined between the vector 61 and a reference vector e.g. a plane angle measured anti-clockwise (as seen by a user of the display screen) from a particular reference direction (in the plane of the display screen) in fixed relation to the display screen. In some embodiments, the reference direction is right. However, other reference directions may be used. In step 74 a colour corresponding to the determined angle is determined based upon the colour mapping information 20 stored in the memory 12. For example, step 74 may comprise the CPU 11 examining the look-up table stored in memory 12 to determine the colour corresponding to the angle of the selected vector 61. The vector 61, or an indication thereof, is then displayed on the display 14 in the determined colour. In step 76 it is determined whether the displayed vector 61 is the last vector to be displayed. If the vector 61 is the last vector in the trajectory 60, then the method ends in step 76. If the vector 61 is not the last vector in the trajectory 60, then the method moves to step 72, where a new vector e.g. a following vector 62 is selected. In this way, each vector 61, 62, 63 of the trajectory 60 is displayed on the display 14 in a colour corresponding to a direction of that respective vector. In some embodiments, each trajectory is displayed at least partly transparent. That is, an underlying one or more trajectories may be partly visible through an overlying trajectory. Furthermore, in some embodiments, a background colour onto which the plurality of trajectories are displayed is determined such that when more than one trajectories overlie each other, the partly transparent trajectories are unlikely to mix in colour and adopt a colour similar to that of the background.

Figure 1:
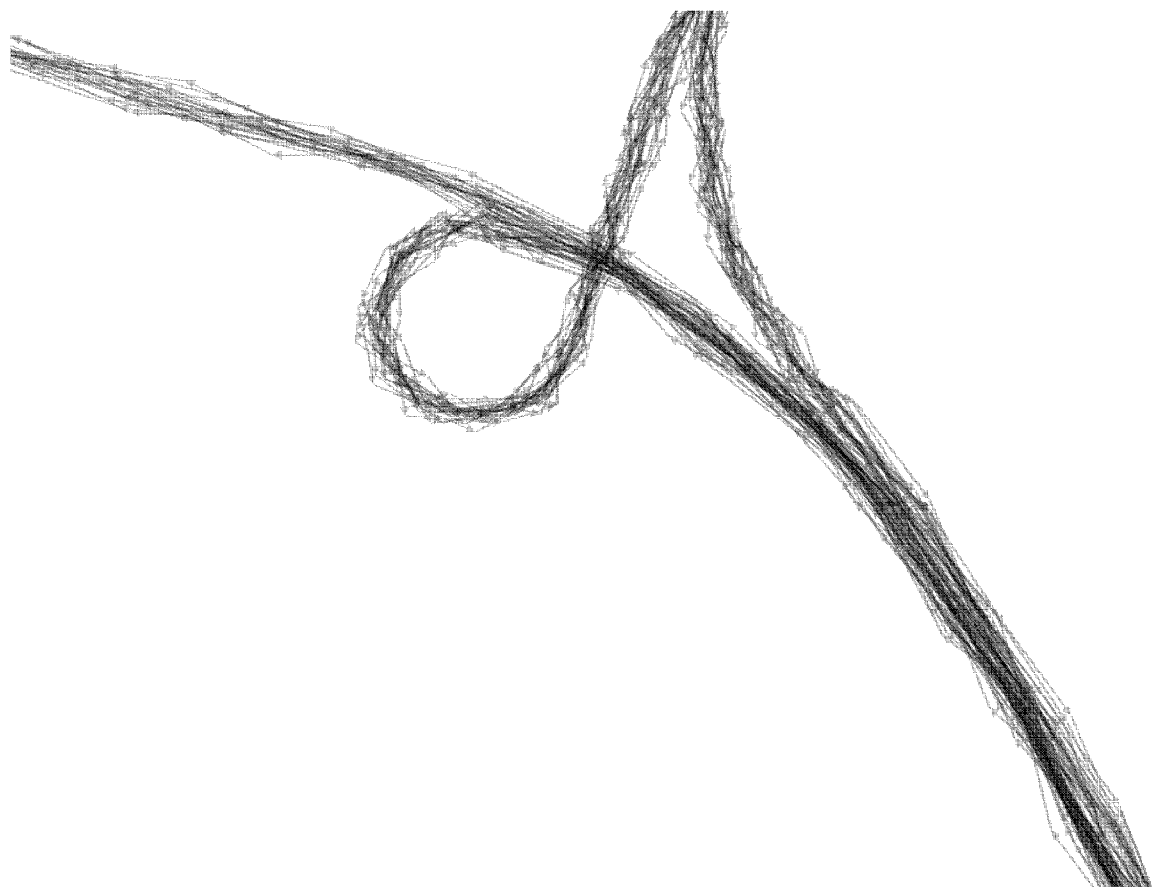
FIG. 1 is an example illustration of a plurality of trajectories.
Figure 6A:
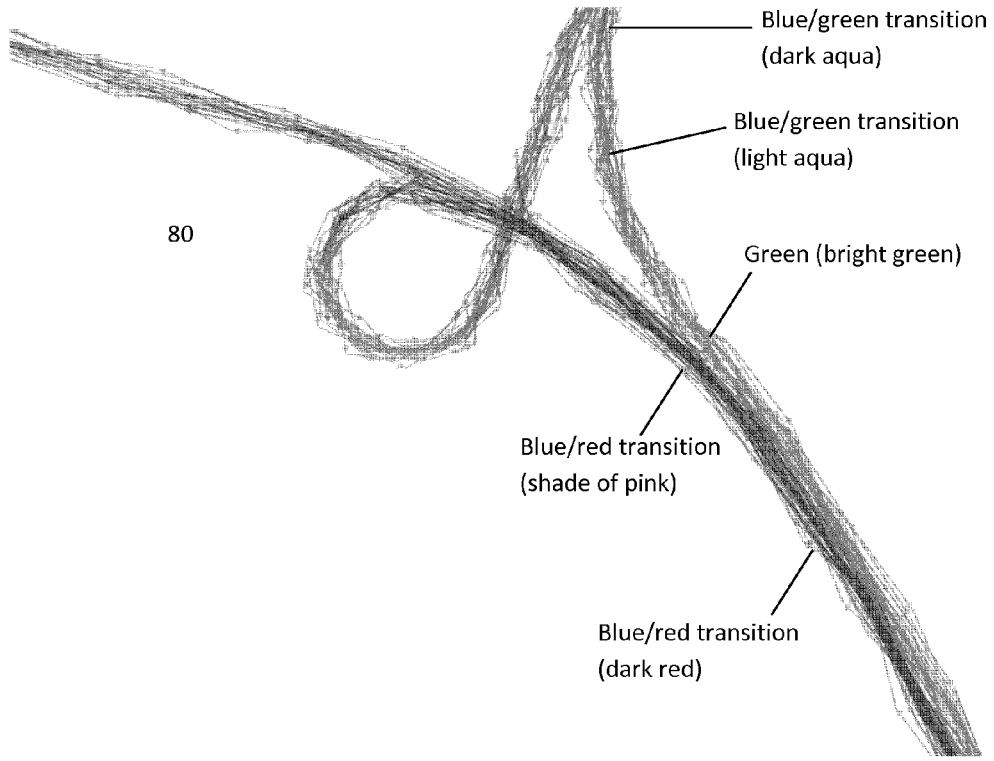
FIG. 6 is an illustration of a plurality of trajectories displayed by an embodiment of the invention.
Figure 6B:
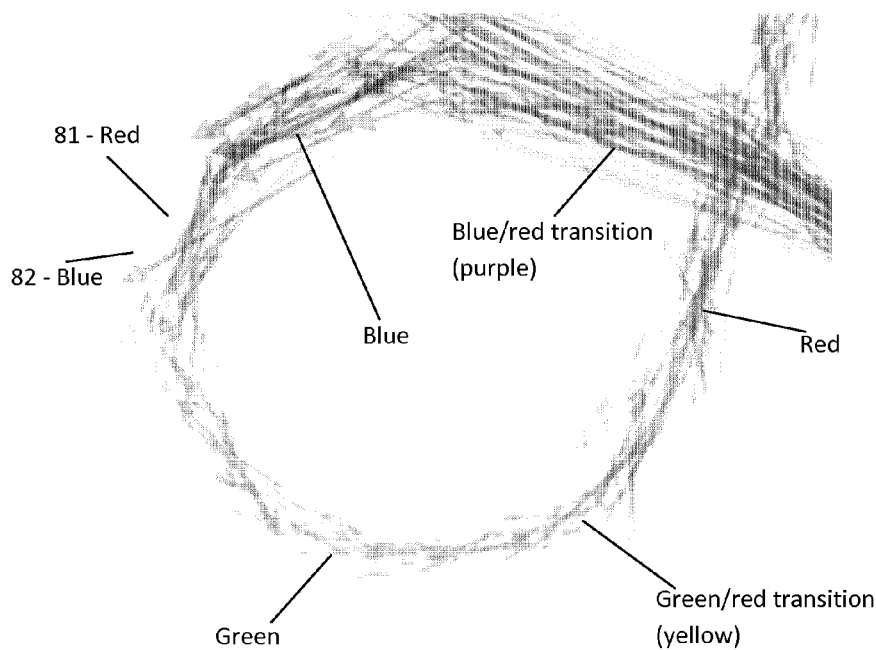

FIG. 6(a) shows the twenty one simulated vehicle trajectories 80 of FIG. 1 displayed according to an embodiment of the invention. FIG. 6(b) shows an enlarged portion the trajectories shown in FIG. 6(a). The enlarged portion represents a slip-road between two major roads. To aid understanding of the invention, especially when the Figures are reproduced in greyscale, FIGS. 6(a) and (b) have been labelled with an indication of the local colour of the vectors forming the trajectories. From FIGS. 6(a) and (b) it will be understood that the each vector adopts a colour which corresponds to the direction of that vector on the annulus shown in FIG. 3.

Referring particularly to FIG. 6(b), it can be seen that one of the trajectories 81, an "opposing trajectory", travels in a direction generally opposed to that of the other trajectories. An example trajectory is indicated as 82. At the point indicated in FIG. 6(b) the opposing trajectory includes a vector adopting a generally red colour corresponding to a generally upward direction in the annulus of FIG. 3. In contrast, the example trajectory 82 has a vector adopting a generally blue colour corresponding to generally downward direction in the annulus of FIG. 3. Advantageously, embodiments of the present invention render the opposing trajectory 81 easily distinguishable from other trajectories, even when the trajectories overlie each other.

Whilst embodiments of the invention have been described with reference to trajectories formed by a plurality of discrete vectors, wherein each vector is coloured according to its local direction, other embodiments may be envisaged in which a continuous trajectory, i.e. not formed of discrete vectors, is coloured in a continually changing manner. That is, a colour of the trajectory at each point is determined according to a direction of a tangent vector at that point on the trajectory. In some embodiments, the colour of the trajectory may be determined at periodic intervals and the colour of the trajectory in-between those intervals is a graduated change between the adjoining determined colours. Furthermore, embodiments of the invention may be envisaged wherein a graphical feature, such as an indication of a current position of a physical entity, is indicated in a colour which corresponds to its direction of movement. For example, an average direction of movement may be determined using a plurality of previous position measurements and the average direction of movement indicated in a corresponding colour.

Embodiments of the invention may be a system or device capable of displaying parameterised coordinate pairs on a display device, wherein the coordinates are those of the display device. The coordinate pair may represent a three-dimensional GPS-derived measurement projected onto a WGS (World Geodesic System) 84 ellipsoid and subsequently displayed on the display device. However, in other embodiments, the coordinate pair may be representative of a simulated or measured parameter plotted on the display device against an index such as time, for example a stock-market price, or other value.

A further embodiment of the invention will now be described with reference to the apparatus of FIG. 2. The apparatus 10 is arranged to display on the display 14 a trajectory representing a continuous mathematical function, such as sin(x) or cos(x). It will be realised that the particular function is merely illustrative and may, in other embodiments, be a representation of a measured parameter, such as the speed of a vehicle, a mathematical approximation to a plurality of measured values, or a representation of a simulated value. In one embodiment, the CPU 11 is arranged to operatively determine a gradient of a tangent to the trajectory at one or more points of the trajectory. The gradient may be determined by differentiation at each of the points of the trajectory. In other embodiments, the CPU 14 is arranged to operatively determine the gradient at each point of the trajectory by determining an angle of a tangent to the trajectory at each of the points, wherein the gradient may be calculated by tan(angle). A colour in which the tangent is to be represented on the display 14 is then determined by the CPU with reference to the colour mapping information 20 to determine a colour corresponding to the gradient. The colour of the trajectory between the points at which the gradient has been determined may then be established with reference to the adjoining determined colours. In some embodiments, a quadrant of the gradient may be considered. For example, opposing vectors of the same magnitude have the same gradient, by considering the respective quadrants of the trajectories, or the tangents to those trajectories, equal gradients in opposing directions may be distinguished and coloured according to their opposing directions.

Embodiments of the present invention may be envisaged as a road traffic analysis system 10, wherein the display device 14 displays an indication of a location or a path of one or more vehicles. The data may be based upon that received from one or more in-vehicle devices capable of determining their current location, such as satellite-based navigation devices. Similarly, an embodiment of the invention may be envisaged as an air traffic control or monitoring system, wherein each the display device 14 displays an indication of a location or a path of one or more aircraft. Advantageously, in these situations, displaying an indication of the current location or the path of a moving entity, such as a vehicle or aircraft, allows a user to easily distinguish those entities moving in the same direction from those entities having a different direction, even when a plurality of indications are simultaneously displayed.

Embodiments of the present invention may be a portable navigation device.

Portable navigation devices (PNDs) that include GPS (Global Positioning System) signal reception and processing functionality are well known and are widely employed as in-car or other vehicle navigation systems.

In general terms, a modern PNDs comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice (for example the driver may specify that the route should not include motorways or toll roads).

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, the Royal Automobile Club (RAC) provides an on-line route planning and navigation facility at http://www.rac.co.uk, which facility allows a user to enter a start point and a destination whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

It is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above, for example the 720T model manufactured and supplied by TomTom International B.V., provide a reliable means for enabling users to navigate from one position to another.

Figure 7:
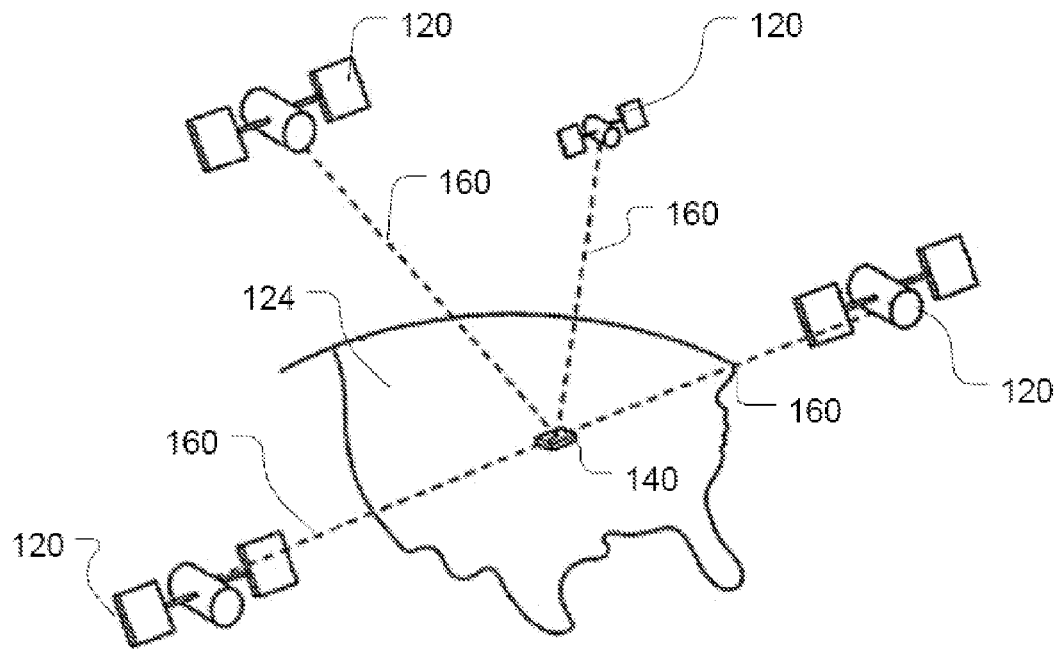
FIG. 7 is a schematic illustration of a Global Positioning System (GPS)

FIG. 7 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 7, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 8:
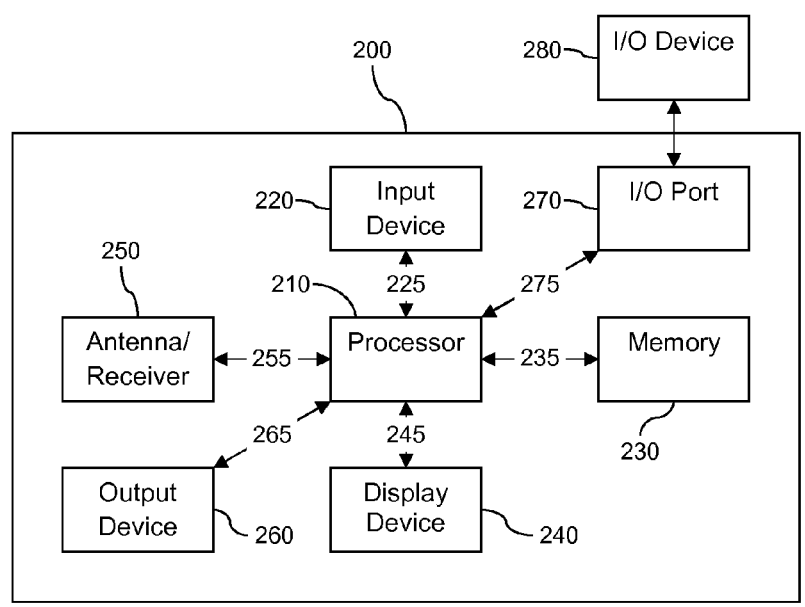
FIG. 8 is a schematic illustration of electronic components arranged to provide a navigation device.

FIG. 8 is an illustrative representation of electronic components of a navigation device 200 according to a preferred embodiment of the present invention, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilised to input information; and the display screen 240 can include any type of display screen such as an LCD display, for example. In a particularly preferred arrangement the input device 220 and display screen 240 are integrated into an integrated input and display device, including a touchpad or touchscreen input so that a user need only touch a portion of the display screen 240 to select one of a plurality of display choices or to activate one of a plurality of virtual buttons.

The navigation device may include an output device 260, for example an audible output device (e.g. a loudspeaker). As output device 260 can produce audible information for a user of the navigation device 200, it is should equally be understood that input device 240 can include a microphone and software for receiving input voice commands as well.

In the navigation device 200, processor 210 is operatively connected to and set to receive input information from input device 220 via a connection 225, and operatively connected to at least one of display screen 240 and output device 260, via output connections 245, to output information thereto. Further, the processor 210 is operably coupled to a memory resource 230 via connection 235 and is further adapted to receive/send information from/to input/output (I/O) ports 270 via connection 275, wherein the I/O port 270 is connectable to an I/O device 280 external to the navigation device 200. The memory resource 230 comprises, for example, a volatile memory, such as a Random Access Memory (RAM) and a non-volatile memory, for example a digital memory, such as a flash memory. The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 8 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 8 are powered by power sources (not shown) in a conventional manner. As will be understood by one of ordinary skill in the art, different configurations of the components shown in FIG. 8 are considered to be within the scope of the present application. For example, the components shown in FIG. 8 may be in communication with one another via wired and/or wireless connections and the like. Thus, the scope of the navigation device 200 of the present application includes a portable or handheld navigation device 200.

In addition, the portable or handheld navigation device 200 of FIG. 8 can be connected or "docked" in a known manner to a vehicle such as a bicycle, a motorbike, a car or a boat for example. Such a navigation device 200 is then removable from the docked location for portable or handheld navigation use.

Figure 9:
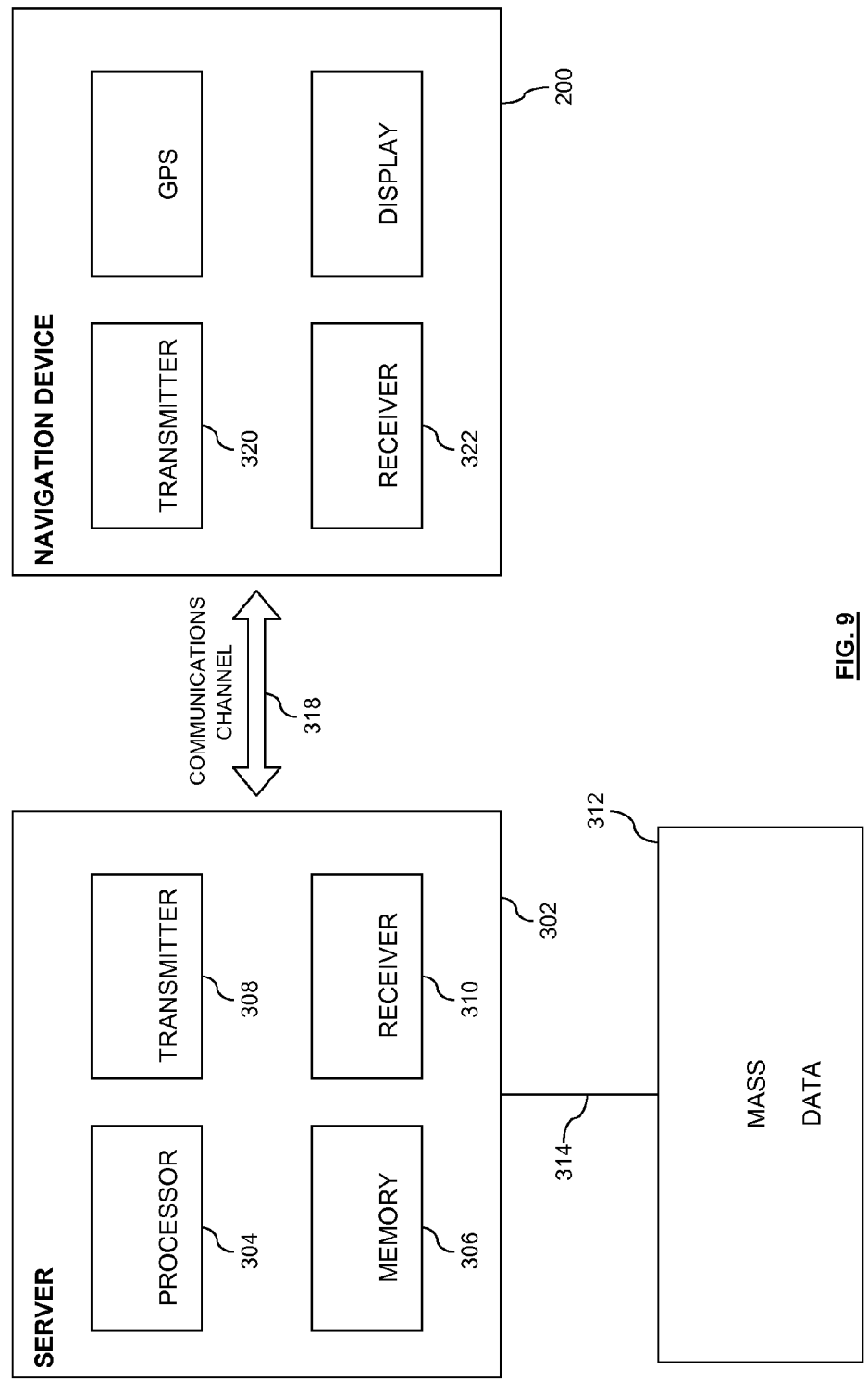
FIG. 9 is a schematic illustration of the manner in which a navigation device may receive information over a wireless communication channel.

Referring now to FIG. 9, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device, and eventually with the internet and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GRPS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

In FIG. 9 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 8, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radiofrequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As indicated above in FIG. 8, a navigation device 200 includes a processor 210, an input device 220, and a display screen 240. The input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 241, such as audio input/output devices for example.

Figure 10A:
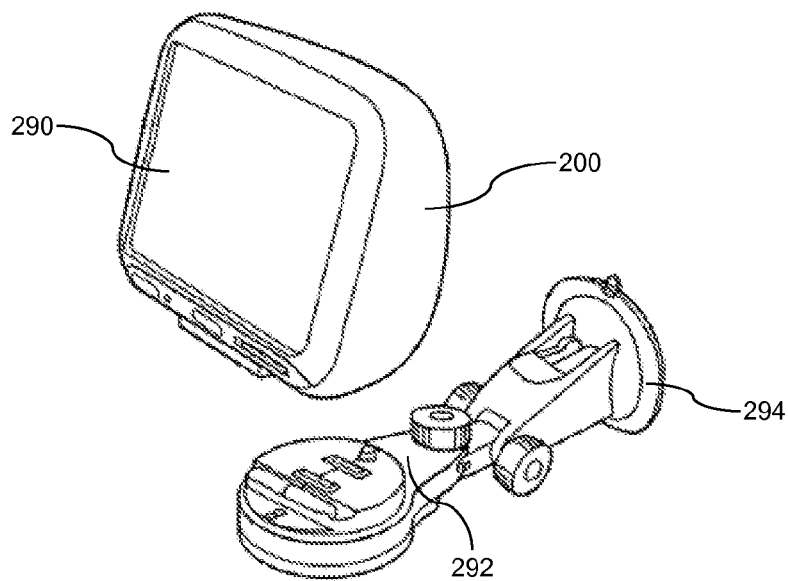
FIGS. 10A and 10B are illustrative perspective views of a navigation device.
Figure 10B:
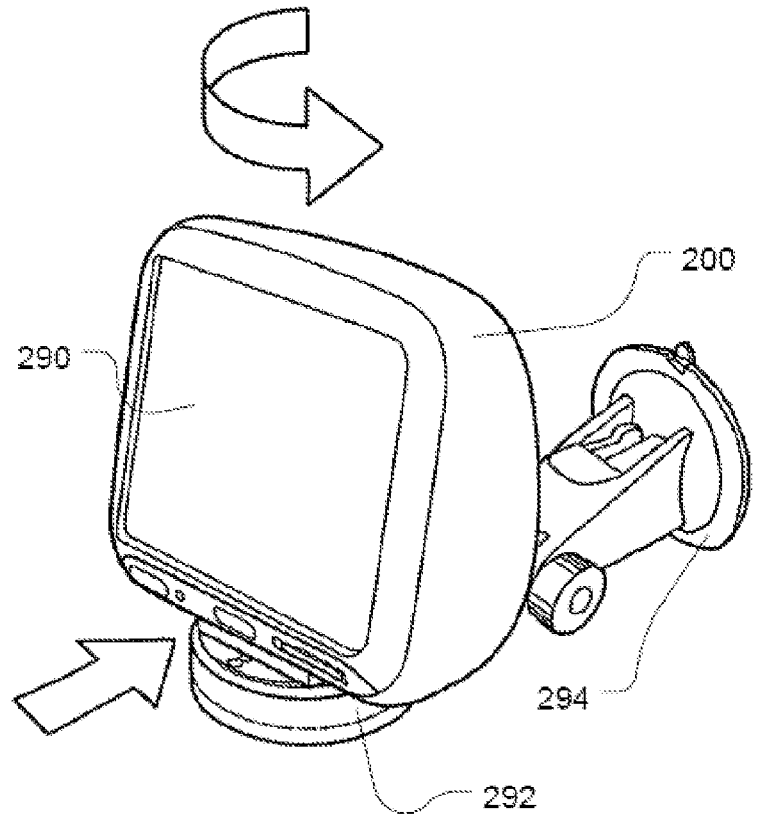

FIGS. 10A and 10B are perspective views of a navigation device 200. As shown in FIG. 10A, the navigation device 200 may be a unit that includes an integrated input and display device 290 (a touch panel screen for example) and the other components of FIG. 2 (including but not limited to internal GPS receiver 250, microprocessor 210, a power supply, memory systems 230, etc.).

The navigation device 200 may sit on an arm 292, which itself may be secured to a vehicle dashboard/window/etc. using a suction cup 294. This arm 292 is one example of a docking station to which the navigation device 200 can be docked.

As shown in FIG. 10B, the navigation device 200 can be docked or otherwise connected to an arm 292 of the docking station by snap connecting the navigation device 292 to the arm 292 for example. The navigation device 200 may then be rotatable on the arm 292, as shown by the arrow of FIG. 10B. To release the connection between the navigation device 200 and the docking station, a button on the navigation device 200 may be pressed, for example. Other equally suitable arrangements for coupling and decoupling the navigation device to a docking station are well known to persons of ordinary skill in the art.

Figure 11:
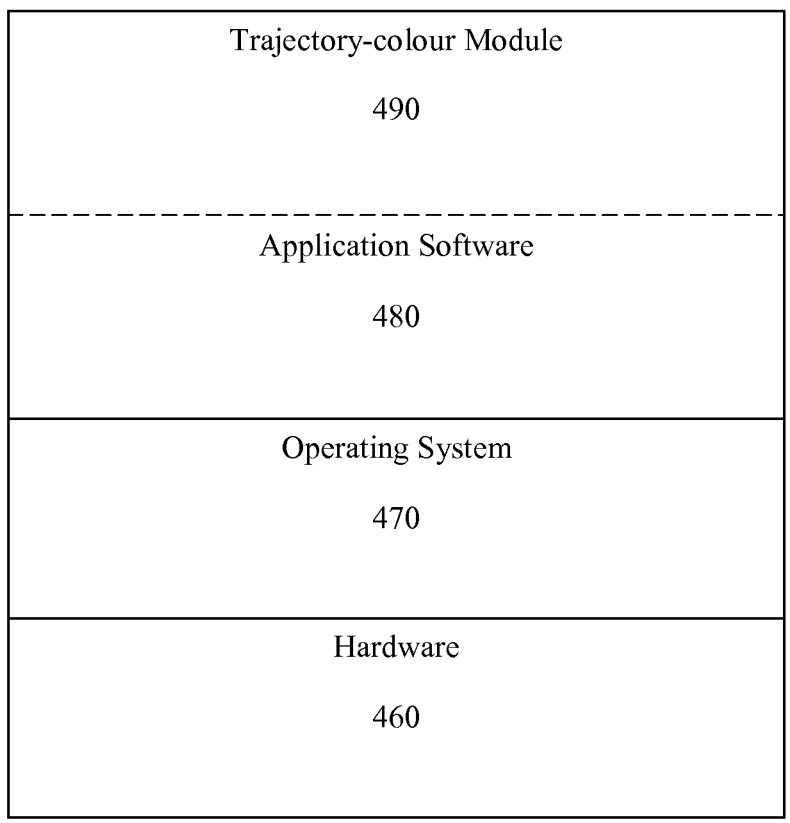
FIG. 11 is a schematic representation of the software employed by the navigation device.

Referring now to FIG. 11 of the accompanying drawings, the memory resource 230 stores a boot loader program (not shown) that is executed by the processor 210 in order to load an operating system 470 from the memory resource 230 for execution by functional hardware components 460, which provides an environment in which application software 480 can run. The operating system 470 serves to control the functional hardware components 460 and resides between the application software 480 and the functional hardware components 460. The application software 480 provides an operational environment including the GUI that supports core functions of the navigation device 200, for example map viewing, route planning, navigation functions and any other functions associated therewith. In accordance with the preferred embodiment of the present invention, part of this functionality comprises a trajectory-colour display module 490. The trajectory-colour module 490 implements the display of a trajectory in a colour which indicative of local orientation-related information, such as a local heading, direction or gradient of the trajectory, as previously explained with reference to FIGS. 1-6.

In one embodiment, the navigation device 200 is arranged to display traffic information in a colour which allows identification of a direction of the traffic delay. For example, the navigation device may receive traffic information from the server 302 via the communications channel. The trajectory-colour module 490 operatively controls the processor 210 of the navigation device 200 to display on the display device 240 an indication of, for example, a traffic delay on an area of map data. In order to allow the user to distinguish a direction of the traffic delay, i.e. whether the traffic delay is affecting traffic in a first direction on a road rather than an opposed second direction, the trajectory-colour module 490 determines a colour of a visual traffic delay notification according to the direction of the traffic delay. The trajectory-colour module 490 may determine the colour by comparing the direction of the road on which traffic is delayed against colour mapping information, as depicted in FIG. 3. In this way, if a user views a large area of map data such that a plurality of traffic delay indications overlap, the user is still able to ascertain a direction of the traffic delays. In some embodiments of the invention, an intensity or brightness of the traffic delay indication may be determined according to a severity of the traffic delay. For example, a traffic delay of 10 minutes may be displayed having a brightness level of X, whilst a traffic delay of 30 minutes may be displayed having a brightness level of Y, wherein Y is a greater intensity then X.

In another embodiment of the invention, the navigation device 200 is arranged to receive information indicative of a location of each of one or more entities. In one embodiment, the entities are other navigation devices which are arranged to periodically report their location to the server 302 via the communications channel 318. Another navigation device 200 comprising the trajectory-colour module 490 is arranged to receive location information from the server 302 identifying the respective locations of the one or more other navigation devices 200. The navigation device 200 receiving the location information is arranged to display map data on the display device including an indication of the location of one or more of the other navigation devices, wherein the indication has a colour determined according to a direction of movement of the indication. For example, if the location information indicates that a navigation device 200 has moved from a first location at a time of last update to a second location, the trajectory-colour module 490 is arranged to determine a direction or gradient of a vector between the first and second locations of the navigation device 200 and a colour in which the indication of that navigation device's location is displayed according to the determined direction.

Embodiments of the present invention will now be described with particular reference to a PND. It should be remembered, however, that the teachings of the present invention are not limited to PNDs but are instead universally applicable to any type of processing device that is configured to execute navigation software so as to provide route planning and navigation functionality. It follows therefore that in the context of the present application, a navigation device is intended to include (without limitation) any type of route planning and navigation device, irrespective of whether that device is embodied as a PND, a navigation device built into a vehicle, or indeed a computing resource (such as a desktop or portable personal computer (PC), mobile telephone or portable digital assistant (PDA)) executing route planning and navigation software.

It will also be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, whilst embodiments described in the foregoing detailed description refer to GPS, it should be noted that the navigation device may utilise any kind of position sensing technology as an alternative to (or indeed in addition to) GPS. For example the navigation device may utilise using other global navigation satellite systems such as the European Galileo system. Equally, it is not limited to satellite based but could readily function using ground based beacons or any other kind of system that enables the device to determine its geographic location.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. An apparatus for displaying route data received from one or more navigation devices, comprising:
    a display device to display graphical information including one or more trajectories, each trajectory indicating a route travelled by said one or more navigation devices;
    a processor arranged to control the display device to display the graphical information;
    a store for colour mapping information, said colour mapping information being representative of a relationship between orientation-related information of a trajectory and colour, the orientation information comprising an angle and/or gradient; and
    a trajectory-colour module to determine orientation-related information of a trajectory and related colour according to the colour mapping information, said processor being responsive to the trajectory-colour module to control the display device to display a graphical element at least partly in the determined colour, wherein the determined colour provides an indication of a direction of movement or heading of a navigation device on the relevant part of said trajectory.

2. The apparatus of claim 1, wherein each trajectory comprises one or more vectors, and wherein the trajectory-colour module is arranged to determine the orientation-related information as an angle between each vector related to the trajectory and a reference vector.

3. The apparatus of claim 1, wherein the gradient is a vector related to the trajectory.

4. The apparatus of claim 1, wherein the colour mapping information comprises a plurality of colours selected to represent a plurality of reference information values, wherein interposing information values are assigned a colour determined as a mixture of the adjoining colours.

5. The apparatus of claim 1, wherein the colour mapping information is held in the store as one of a look-up table or one or more equations.

6. The apparatus of claim 1, wherein the trajectory-colour module is arranged to determine the orientation-related information of the trajectory based upon a tangent to a point on the trajectory or between at least first and second points on the trajectory.

7. The apparatus of claim 6, wherein the points are indicative of geographical locations of an entity.

8. The apparatus of claim 5, wherein the graphical element is one of the vector linking the first and second reference points, or a local colour of a trajectory.

9. The apparatus of claim 1, wherein the apparatus is a portable navigation device comprising a receiver to receive data from a server, wherein the trajectory-colour module is arranged to determine the orientation-related information of the trajectory from the received data.

10. The apparatus of claim 2, wherein the trajectory-colour module displays each vector of the trajectory in a corresponding determined colour.

11. A graphical display method for displaying, on a display device, route data received from one or more navigation devices, comprising:
    determining orientation-related information of a trajectory, wherein the trajectory indicates a route travelled by said one or more navigation devices, the orientation-related information comprising an angle and/or gradient;
    determining a colour corresponding to the orientation-related information; and
    displaying a graphical element on the display device at least partly in the determined colour, wherein the determined colour provides an indication of a direction of movement or heading of a navigation device on the relevant part of said trajectory.

12. The method of claim 11, wherein each trajectory comprises one or more vectors and wherein the orientation-related information is a direction of the trajectory determined as an angle between each vector related to the trajectory and a reference vector.

13. The method of claim 11, wherein the gradient is a vector related to the trajectory.

14. The method of claim 11, wherein determining the colour comprises looking-up the colour corresponding to the information in a look-up table stored in a memory, or calculating one or more colour values corresponding to the information.

15. The method of claim 11, further comprising:
    receiving information from one or more devices indicative of a location of each device in a coordinate system, wherein the trajectory is determined between successive locations of a device.

16. The method of claim 15, wherein each trajectory is formed by one or more graphical elements in the determined colour.

17. The method of claim 12, wherein each vector of the trajectory is displayed in a corresponding determined colour.

* * * * *